(12) United States Patent
Acklen et al.

(10) Patent No.: US 11,974,192 B1
(45) Date of Patent: *Apr. 30, 2024

(54) SYSTEM AND METHOD FOR SENDING AND RECEIVING SECURITY ALERTS AT DIFFERING LOCATIONS

(71) Applicant: BlockWatch, LLC, Gilbert, AZ (US)

(72) Inventors: Justin Acklen, Gilbert, AZ (US); Jeremy Conkin, Broomfield, CO (US)

(73) Assignee: BlockWatch, LLC., Gilbert, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,222

(22) Filed: Feb. 3, 2023

Related U.S. Application Data

(63) Continuation of application No. 17/526,955, filed on Nov. 15, 2021, now Pat. No. 11,576,010, which is a continuation of application No. 17/035,226, filed on Sep. 28, 2020, now Pat. No. 11,178,514.

(60) Provisional application No. 62/906,160, filed on Sep. 26, 2019.

(51) Int. Cl.
*H04W 4/021* (2018.01)
*H04W 4/029* (2018.01)
*H04W 4/90* (2018.01)
*H04W 12/30* (2021.01)
*H04W 68/00* (2009.01)

(52) U.S. Cl.
CPC .......... *H04W 4/029* (2018.02); *H04W 4/022* (2013.01); *H04W 4/90* (2018.02); *H04W 12/30* (2021.01); *H04W 68/005* (2013.01)

(58) Field of Classification Search
CPC ....... H04W 4/029; H04W 4/90; H04W 4/022; H04W 12/30; H04W 68/005
USPC ...................................................... 455/456.1
See application file for complete search history.

(56) References Cited

U.S. PATENT DOCUMENTS

| 8,400,296 | B2 | 3/2013 | Brinton |
| 8,782,740 | B1 | 7/2014 | Sarra |
| 2013/0040600 | A1* | 2/2013 | Reitnour ........... H04M 1/72424 455/418 |
| 2014/0187200 | A1 | 7/2014 | Reitter |
| 2018/0206100 | A1* | 7/2018 | Eisner .................. H04W 12/02 |

OTHER PUBLICATIONS

Notice of Allowance dated Oct. 3, 2022 for U.S. Appl. No. 17/526,955 (pp. 1-12).

* cited by examiner

*Primary Examiner* — Ted M Wang
(74) *Attorney, Agent, or Firm* — BOOTH UDALL FULLER, PLC; Bryce W. Burnham

(57) ABSTRACT

A system for facilitating sending and receiving of security alerts may include a processor communicatively coupled to a memory and a network interface, the network interface communicatively coupled to a network. A fixed location manager and a roving location manager may be communicatively coupled to the network interface and the network and may be configured to: (i) receive security messages from a plurality of user mobile devices coupled with the network, (ii) create a fixed forum security message and a roving forum security message, each of which is associated with a geographic location of one of the security messages, and (iii) send the fixed forum security message and the roving forum security message to all of the plurality of user mobile devices that comprise a fixed alert area or a roving alert area associate with the geographic location.

20 Claims, 6 Drawing Sheets

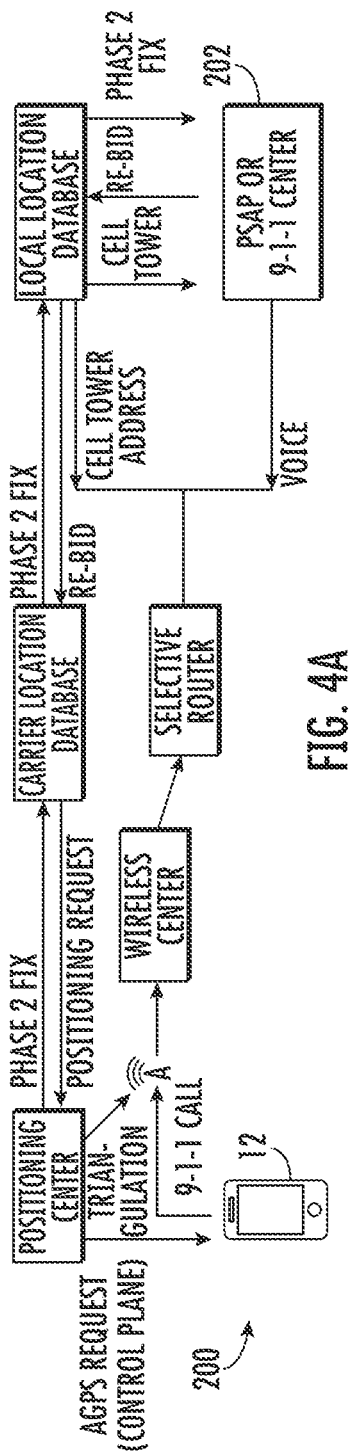
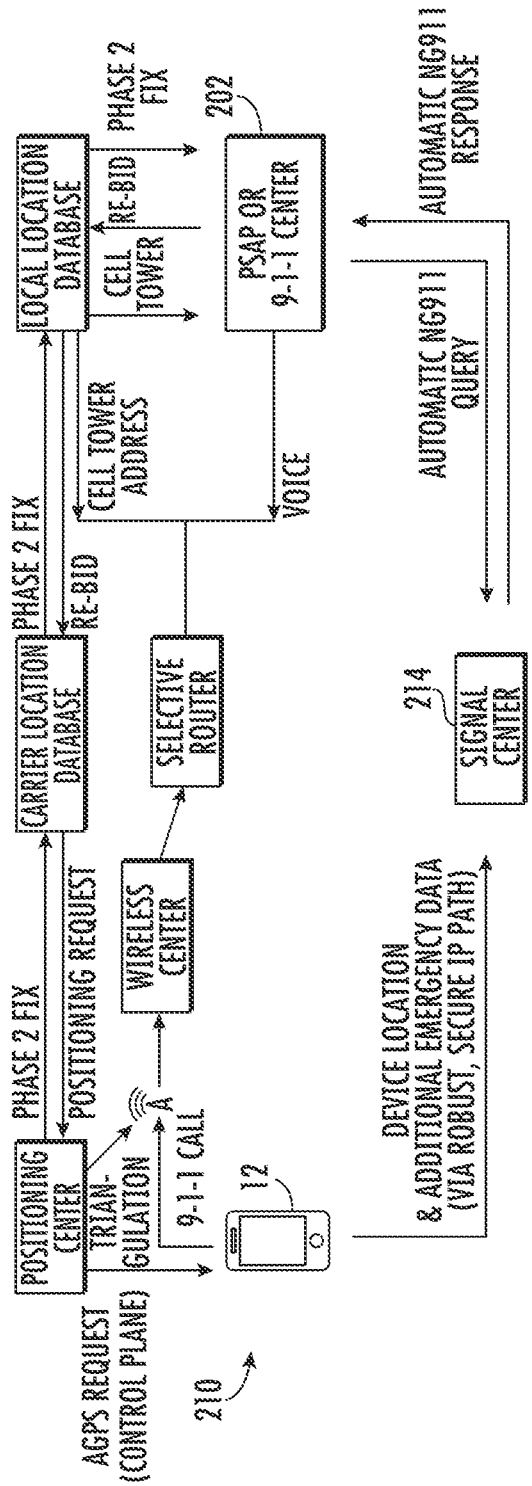

SYSTEM AND METHOD FOR SENDING AND RECEIVING SECURITY ALERTS AT DIFFERING LOCATIONS

RELATED APPLICATIONS

This application is a continuation of U.S. Non-provisional patent application Ser. No. 17/526,955, filed on Nov. 15, 2021, titled "System And Method for Sending and Receiving Security Alerts at Differing Locations," which application is a continuation of U.S. non-provisional patent application Ser. No. 17/035,226, filed on Sep. 28, 2020 titled "System And Method for Sending and Receiving Security Alerts at Differing Locations," which application claims the benefit of U.S. provisional patent application 62/906,160, filed Sep. 26, 2019 titled "System and Method for Sending and Receiving Security Alerts at Differing Locations," the entirety of the disclosures of which are hereby incorporated by this reference.

TECHNICAL FIELD

Aspects of this document relate generally to a system and method for sending and receiving security alerts at differing locations, such as through or with a 3d party app or platform that connects with a plurality users or user mobile devices, such as through a security forum (SF).

BACKGROUND

Humans, as social creatures, have historically been able to form groups or organize themselves to protect against external dangers, such as from dangerous, harmful, or violent individuals or groups in order to provide increased protection or safety. By working together, people can help each other, and produce improved and safer environments.

Social media and various electronic applications have been employed as ways to bolster or improve human connectivity and safety. However, a number of modern social pressures and forces have made it desirable for improvements in communication and safety.

SUMMARY

A need exists for an improved system and method for sending and receiving security alerts at differing locations. In an aspect, a system for facilitating sending and receiving of security alerts may comprise a security forum comprising a processor communicatively coupled to a memory and a network interface, the network interface communicatively coupled to a network, wherein the memory further comprises a fixed location manager, and a roving location manager. A plurality of user mobile devices may run a security alert mobile application and be communicatively coupled with the security forum through the network and the network interface. The plurality of user mobile devices, through the network and the network interface, may be configured to communicate with the security forum to send a first security message associated with a first geographic location to the fixed location manager and to the roving location manager. The plurality of user mobile devices may also be configured to receive a plurality of forum security messages from the fixed location manager and the roving location manager. The security forum, through the network and the network interface, may be configured to receive a plurality of security messages from the plurality of user mobile devices, including a first security message from one of the plurality of user mobile devices. The security forum, through the network and the network interface, may also be configured to send a plurality of forum security messages to the plurality of user mobile devices, including a first forum security message sent to all of the plurality of user mobile devices when: (i) a geographic location associated with each of the plurality of user mobile devices is within a fixed alert area of the each of the plurality of user mobile devices, or (ii) when a geographic location associated with the first forum security message is within a roving alert area of each of the plurality of user mobile devices.

The system for facilitating sending and receiving of security alerts may further comprise content of the first security message being identical to content of the first forum security message, and the first geographic location associated with the first security message being identical to the geographic location associated with the first forum security message. The first geographic location associated with first security message may be a geographic location of the user mobile device sending the first security message as determined, at least in part, by a GPS location of the user mobile device sending the first security message. The geographic location associated with the first forum security message and sent to the plurality of user mobile devices may be incorporated from the fixed location manager and from the roving location manager. The fixed alert area may be a circle with a center of the circle at a fixed location, the fixed location comprising one of a domicile, a place of work, or a school. The fixed alert area may comprise a user selected radius in a range of 0.16-3.22 km (0.1-2.0 miles). The roving alert area for each of the plurality of user mobile devices may be a circle with a center of the circle at a position of the respective user mobile device. A length of a radius of the roving alert area may be proportional to a moving speed of the user mobile device. A single forum security message may be sent from either the fixed location manager or the roving location manager to a portion of the plurality of user mobile devices when a geographic location associated with the forum security message is within both the fixed alert area and the roving alert area for the portion of the plurality of user mobile devices. The roving location manager may be configured to forward a security message from the mobile user device to a PSAP using a rapid PSAP method.

In another aspect, a system for facilitating sending and receiving of security alerts may comprise a processor communicatively coupled to a memory and a network interface, the network interface communicatively coupled to a network. A fixed location manager may be communicatively coupled to the network interface and the network and be configured to receive security messages from a plurality of user mobile devices coupled with the network. The fixed location manager may create a fixed forum security message associated with a geographic location of a first security message received from at least one of the plurality of user mobile devices. The fixed location manager may send the fixed forum security message to all of the plurality of user mobile devices that comprise a fixed alert area that comprises the geographic location associated with the first forum security message. A roving location manager may be communicatively coupled to the network interface and the network and configured to receive security messages from the plurality of user mobile devices coupled with the network. The roving location manager may create a roving forum security message associated with a geographic location of a second security message received from one of the plurality of user mobile device. The roving location manager may send a roving forum security message to all of the plurality of user mobile devices that comprise a roving alert area that comprises the geographic location associated with the roving forum security message.

The system may further comprise the roving forum security message not being sent to any of the plurality of user mobile devices that have already received a fixed forum security message when a geographic location associated within the roving forum security message is within both the fixed alert area and the roving alert area. A roving forum security message may not be sent to any of the plurality of user mobile devices that comprise a roving alert area that comprises the geographic location associated with the roving forum security message after an expiring period of time has elapsed or after an underlying matter that forms a basis of the security message is resolved. The fixed location manager, the roving location manager, or both, may receive a plurality of security messages from the plurality of mobile user devices formed on a basis of a same underlying matter, such that the fixed forum security message and the roving forum security message are created by consolidating the plurality of security messages from the plurality of mobile user devices based on the same underlying matter. The roving location manager may be configured to forward a security message from the mobile user device to a PSAP using a rapid PSAP method.

In yet another aspect, a method for facilitating sending and receiving of security alerts may comprise receiving a security message from a plurality of user mobile devices, the security message comprising geographic location information. A fixed forum security message may be created within a security forum for a portion of the plurality of user mobile devices. The geographic location information from the security message may be associated with the forum security message. The forum security message may be sent to at least a portion of the plurality of user mobile devices from a fixed location manager or a roving location manager when the geographic location associated with the forum security message is within a fixed alert area or a roving alert area of the at least a portion of the plurality of user mobile devices.

The method of facilitating sending and receiving of security alerts may further comprise sending a roving forum security message to user mobile devices only when a geographic location associated within the roving forum security message is within the roving alert area of the user mobile devices and is not within the fixed alert area of the user mobile devices.

The method of facilitating sending and receiving of security alerts may further comprise receiving at the fixed location manager, the roving location manager, or both, a plurality of security messages from the plurality of mobile user devices formed on a basis of a same underlying matter. The plurality of security messages formed on the basis of the same underlying matter may be consolidated to form a consolidated forum security message and sending the forum security message may further comprise sending the consolidated forum security message. The method of facilitating sending and receiving of security alerts may further comprise the security forum forwarding a security message from the mobile user device to a PSAP using a rapid PSAP method. The method of facilitating sending and receiving of security alerts may further comprise sending the forum security message from the fixed location manager when a fixed alert area is a circle with a center of the circle at a fixed location, the fixed location comprising one of a domicile, a place of work, or a school.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the description and figures included herein.

BRIEF DESCRIPTION OF THE DRAWINGS

FIGS. 4A and 4B illustrate flow charts of how communications are routed to PSAPs in conventional and rapid response systems.

DETAILED DESCRIPTION

Figure 1C:
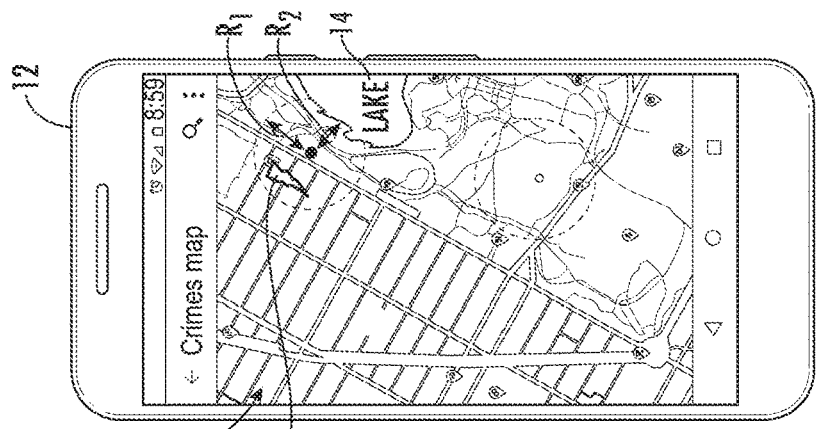
FIGS. 1A-1F illustrate examples of graphical user interfaces (GUIs) for a user experience with a security forum (SF).

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Broadly speaking, FIGS. 1A-5 illustrate instances in which a user, individual, or member 10 may send and receive security messages 140 and forum SMs 144, or otherwise monitor and share safety alerts, crime alerts, and notices, such as those based on (or representing) crimes or dangerous activity through security forum (SF) 100. The users 10 may be formed or organized by neighborhoods, groups, watches, blocks, coalitions, or any other designation, which may hereinafter be referred to, for convenience and not by way of limitation, as a neighborhood within SF 100.

Figure 1B:
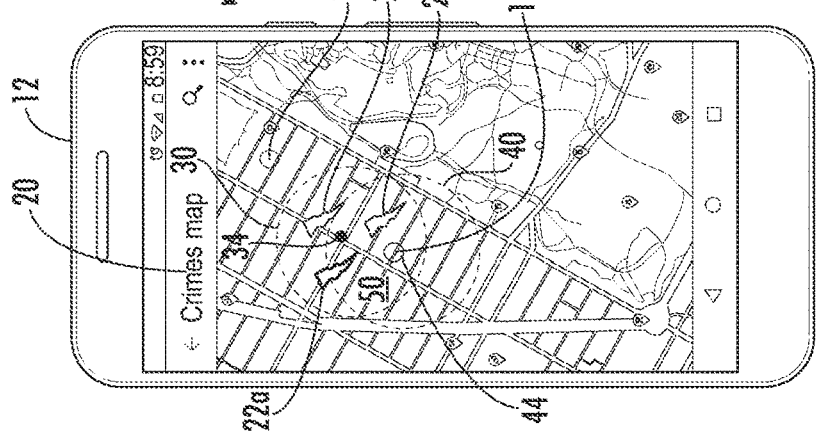
Figure 1A:
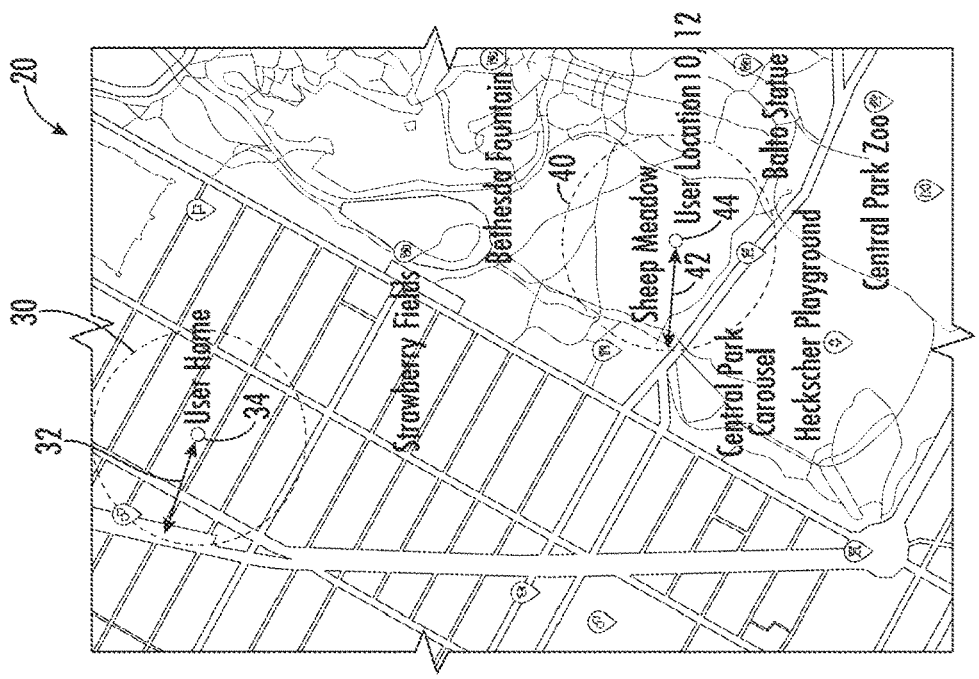

FIG. 1A shows a user mobile device 12 running the security app 14 that is in contact with the SF 100. The security app 14 is shown displaying map 20, with various geographic locations 21. A fixed alert area 30 comprising a fixed alert radius 32 and a fixed alert center 34 at a user's home or domicile is shown. Additionally, a roving/variable alert area 40 is shown comprising a roving alert radius 42 and a roving alert center 44 and a geographic location of user mobile device 21a.

Stated another way, FIG. 1A shows a user's home base or domicile represented by a blue dot titled "user home" and a radius or perimeter around the User Home. FIG. 1 also shows a "User Location" or dynamically changing physical location in which is separated from the User Home, which also includes a radius or perimeter around the User Location.

The radius may be fixed, such as at 10 meters, 100 meters, or a kilometer, or any desired distance, and may also be dynamically changing, such as based on movement of speed, so that the perimeter is time based, such as something the user is expected to contact or near in 30 seconds or a minute, and as such can change based on user speed, such as walking, biking, riding a bus, or driving a car.

The home radius and the user radius may be of the same or different size or area, and may be fixed or change based on user input or automatically adjusted based on a user profile, user preference, or other factors. When a user is at home and the home location and the user location are the same or nearly the same, only one position and perimeter may be shown on a user device. Then when a user leaves their home, they have two zones of interest. In some instances, other zones of interest can also be selected, such as for children, family, pets, places of work, or other desirable location.

When a user leaves their home, the dynamically changing user position may automatically be on by default and alerts can be send to the user, such as through the user device, based on multiple zones of interest. The user may also select a limited number of zones for which the user is receiving real-time updates. Others may be stored in a library or database for subsequent access.

A user may only receive updates/alerts from posts or incidents that happen within their specified radius or radii. However, posts that that user makes or information that the user shares may extend to other users outside of the poster's radius, depending on their setting. For example, a first user may only want notifications within 100 meters, a second user within 1 km, and if both were to post, the first user would not receive the second user's shared information, while the second user would see the information shared by the first user. In other instances, the range or perimeter size can be vary based on the severity of the incident being reported (such as deadly force or a life-threatening situation, verses shoplifting or petty theft), where a person has more interest and monitors a larger area/perimeter for more serious dangers.

In some instances, a user profile with user preferences and risk tolerance data may be gathered in which a history, artificial intelligence, and predictive analytics may be employed to allow a user to dismiss and a profile risk tolerance be developed based on items that are not of interest and a user does not want to see again in a similar situation. The showing of an alert can change based on user/member experience and posting history.

Users will be spared undesired notification for alerts from incidents outside of their designated radius or area(s) of interest. As such, a member may always have access to home area alerts regardless of their physical location, and may also have the additional benefit of receiving real-time updates for the local areas where they travel during the day away from their home, such as at work, during a commute, when shopping or at entertainment events.

FIG. 1B, shows an example of a user 10 away from their home 34 with the fixed alert area 30 different from, but overlapping with the roving/variable alert area 40, the fixed alert area 30 and the roving alert area 40 comprising a common area 50 between fixed alert area and roving alert area.

In addition to a user 10 being in contact with others users 10 of the SF 100, whether on a mobile wireless device or through a browser or other suitable interface, indications of crime or dangerous activity can be based on both personal observation and by the observations of others, both near one's home or domicile as well as outside the boundaries of your home. Other members can be verified members that have a proven track record of accurate reporting, to reduce and control for misinformation. A verified or experienced member can be given a weighted preference in terms of validating information posted on, or shared through, the system. Verified members can even include peace officers, such as members of the police force, detectives, city employees such as employees or contractors of the postal service, waste management or trash/recycling collection, or others that have regular routes and provide accurate and consistent reporting, and may have a sense of normal patterns and abnormalities that indicate crime or nefarious activity. In some instances, a verified user can be matched to, or verified against users with similar risk tolerances or profiles, similarities in what appears to be suspicious activity, or known personal contacts.

In addition to posts of crimes or suspicious activity that may be weighted to have more relevance based on the source of the user making the post (such as a police dispatcher or post created from police dispatches, or a long-term reliable user with an accurate track record), other ways of weighting or giving credence to threats may also be employed. For example, credence may be given based on the strength of a user's conviction. If a person "knows" or is "certain" they saw a weapon being concealed, the post may be weighted or given more relevance than a person who "thinks" or "suspects" they saw something, but is uncertain. Furthermore, additional credence may be given to a reported incident based on the number of individuals reporting the incident, where 3 individuals reporting the same or similar event or individual increases the credibility or certainty of the individual or act.

As such as the certainty of suspicion or criminal activity increases, and indication of the strength of the threat or incident may be so indicated to the user through a display. The indication may be visual, such as a banner or pop-up message, or include changing one or more features of a threat icon (shown in FIG. 1B as a lightning bolt, but includes any desirable feature or icon) such as its size or color. As the seriousness or certainty of a crime increases a size of the icon may increase. In other instances, as the seriousness or certainty of a crime increases a color of the icon may become more intense, such as moving from yellow (or other cool color) indicating a watch or warning, to more intense colors such as orange and red showing a more imminent or serious threat.

In some instances, a post of suspicious or illegal activity will remain at the physical location indicated by the reporting party until dismissed or marked irrelevant, which can be done by the posting user or one or more other users. In some instances, a posting user may assign a fixed geolocation, such as dropping a pin on a map, taking picture with a handheld mobile device that includes embedded coordinates or geo location information (which may also adjust the point at which the image was captured by the position of the dangerous, suspicious, or illegal activity identified in the image of video). In other instances, a posting user may indicate an initial position and direction of travel such that the hazard is a moving one. For moving hazards, such as drunk or impaired drivers, a user such as a passenger in a following car, may indicate that the offender is directly ahead of them and the danger is based as a moving target offset ahead of the posting user as the user drives along.

In other instances, a user may be able to "flag" or otherwise report a post as spam, or as an inaccurate or incorrect post or including misinformation. In some instances, a user may submit a photo or other evidence in support of its claims. A flagged post can automatically be pulled or removed so that it is no longer visible to other users, and may be reviewed by a program administrator. Flagging of a post as suspect may also be weighted for relevance or credence based on one or more of the factors identified above, or other similar or suitable factor. When a user is flagged for one or more (including multiple) times for inaccurate or misleading posts, or if violations of policies or rules may be discerned, then a user may receive a warning re: their conduct, the user's account may be suspended, frozen, or otherwise disabled, or both. In some instances, additional information may be provided to inform or educate the user, such as by a video, message, or pop up box that explains undesired consequences, penalties, or both, for false/irrelevant alerts In yet other instances, the user making the original post (the originator) may be considered an administrator or first level reviewer or moderator. Other additional or subsequent comments will not be publicly posted or made available to others unless approved by a moderator. As such the originator or other trusted individual can filter through undesirable, incorrect, offensive, or inappropriate posts. In some instances, verified (preferred, trusted, or reliable) users may be preapproved for moderating posts with no additional approval or oversight. As such, the above may discourage, reduce, or prevent spam, bothersome, or irrelevant posts, which in turn may help police or law enforcement from being inundated with irrelevant requests, false positives, and unneeded calls. In some instances, any time a user or member responds to a post, the response is vetted by member who created post and the moderator will then have the option to send member response public or ignore.

Examples of how the above may play out can include the following examples. On a work trip or family vacation a user is driving, needs to stop to refuel with gasoline, and as a gasoline station is identified an alert of suspicious/criminal activity is reported as you approach the gasoline station, and the user is able to make an informed decision to go to a safer location. As noted above, alerts, warnings, and posts need not be limited to recent activity, but may also include known or historical crime history.

As an additional example, a user may see people doing drugs or engaging in other criminal activity, and add a post or alert to the application or system, such as through a handheld or portable electronic wireless device. Similarly, a user may see or overhear an individual or group discussing criminal activity in a store, or acting out, and add a post or alert to the application or system, such as through a handheld or portable electronic wireless device.

Yet another example may include a user that is mingling with other pedestrians in a neighborhood for trick-or-treating, caroling, watching fireworks, or mingling for other festivities.

In some instances, the user of the method or system of sharing alerts may be integrated with police and only police or with other first responders. As an alert is posted, or after an alert is posted, a disclaimer or message may be communicated to the user, such as with a pop-up message, that states that all emergencies need to be reported to 911 or the proper authorities. Messages may be communicated more often, or less often, based on the severity of what is reported, and in severe situations (e.g. life-threatening) may be shown for all such instances.

In some instances, an emergency call could be made through the app or user profile information could be sent to the police. For example, an emergency feature/button could be present as part of the method or present as part of a graphical user interface (GUI) that shares a GPS location with 911, or other emergency responders. In some instances, communication could be established as a normal or conventional telephone call. In other instances, user information could be communicated to 911 or first responders without the user having a need to talk, which could be advantageous when a user would want to remain silent, so as to not disclose a position to gunman or other violent or dangerous individual. In a dangerous situation, a handheld wireless device may also go dark or operate with only dim light to reduce a chance of drawing unwanted attention to a user.

FIG. 1C, shows an instance of a user using the system or method via a handheld wireless device, such as a mobile phone app, with the user's position being shown as a solid blue circle or dot and a range or radius for messages circling partially, but not completely (360° around a position of the user. As shown in FIG. 1C, the roving notification area around the user need not be circular in shape but may comprise a part or portion of the circle, or be of any other suitable shape. A distance or radius of the perimeter may change based on geography, population density (e.g. smaller when there are more people around), crime density, traveling speed (larger area if moving more quickly) geography (accounting for physical barriers like a like a lake or canyon, canal, railroad tracks, walls, or other similar feature from where people, danger, or crime is unlikely to come), political boundaries (such as national border or where a barrier may be present), and activity (such as shopping or attending a sporting event in a stadium or arena)

A size or range of the monitored area may be limited based on a function or type of an activity in which the user is engaged, such as when a user is at a stadium, within a mall, airplane, cruise ship, big box retailer, theme park, movie theater, or other similar location where the user wants to restrict incoming alerts to the area or local where they are. When on premises where security departments are present, the local security personnel or detail may have access to alerts, and users may be able to assist security with reducing or preventing crimes like shop lifting.

When a user is mobile or "floating" and receives updates base on a geographic location 21, a user may be shielded from, and not see, posts from an area that is no longer within the user's radius. An exception may be if the radius is set to find the nearest incident. Another exception may be that a user may continue to view an alert or update in an area after having left it if the user commented on, or chose to follow, the alert, update, or post, in which continued access or visibility may remain.

Additionally, when a user is mobile or "floating" ™ with a roving alert area 40 different from a fixed alert area 30, additional information outside of a user's fixed alert area 30 or home radius is available. Design and functions of the GUI may change to provide visual or other notice to the user of the mobile, roving, roaming, or "floating" status. In such instances, buttons, features, arrangements or configurations may otherwise remain unchanged, and a notice of a watch radius may be present, such as in a beacon, banner, window, or caption that may be pulsing or otherwise denoted, and communicate information such as "WATCHING 1 MILE" or any other desired distance, travel time, or other indication. When no alerts, dangers, suspicious activity or warnings are posted to area of the user or within the user radius, the app may show a safe color. In some instances, users may pay for additional detail, functionality, or services, such as, e.g. having access not historical data showing past crimes.

Figure 1F:
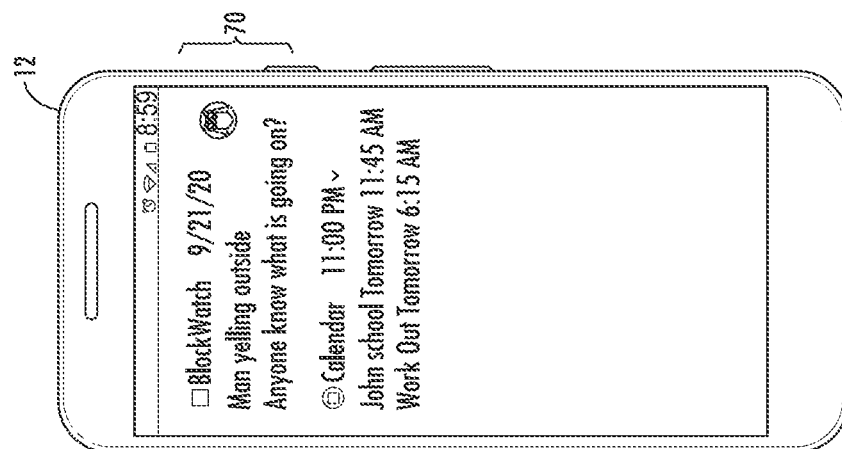
Figure 1E:
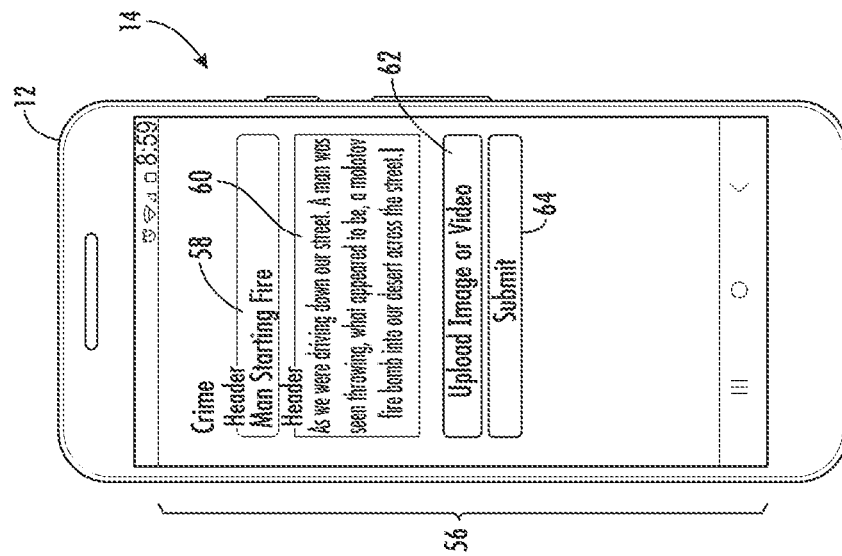
Figure 1D:
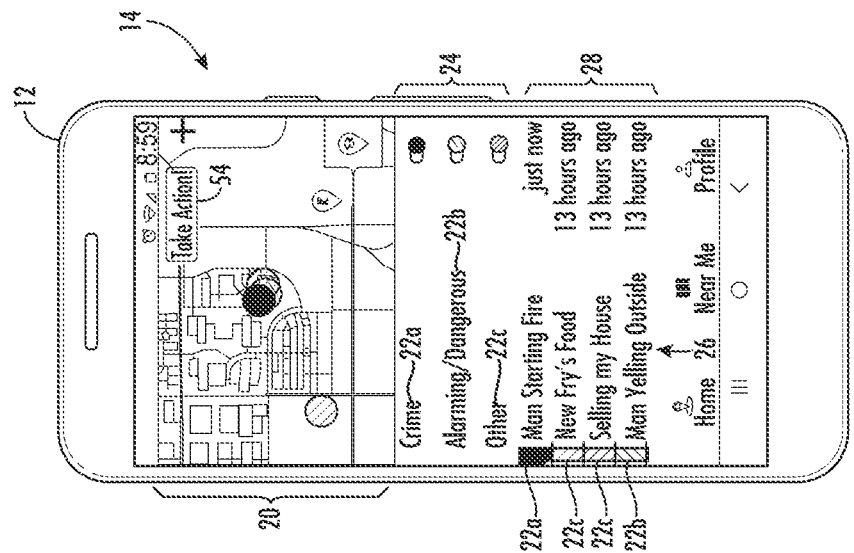

FIG. 1D shows a user mobile device 12 running a security app 14 that is in contact with the SF 100. The security app 14 is shown displaying a map 20 in which geographic locations 21c of forum security messages 144 are shown as alerts or severity scores 22, including: (i) high risk alerts 23, such as for crime, which can be shown in red, (ii) medium risk alerts 22b, such as for alarming/dangerous events, which may be shown in yellow, and (iii) low risk alerts 22c, such as for notices/information, which may be shown in green. A severity score 22 may also depend on whether an event is known or merely suspected, whether the event is from a reputable source, such as from verified source, or from a professional or government organization such as a police dept rather than a single or unknown individual. Thus, in some instances, the UI may reflect reflects severity, an authenticity score, and urgency.

In some instances, material may be reviewed, vetted, flagged, and/or removed if incorrect, suspect, or otherwise misleading. The review may performed by hired staff working with the SF 100, or by trusted, vetted, tested, and reliable users.

FIG. 1D also shows toggles 24 in which each of the alert levels 22a, 22b, and 22c may be toggled on and off. A list of events 26 from the forum security messages 144 is also shown, together with a time of events 28 for each of the events 26. A take action button 54 is also shown at or near a top of the screen (although any desirable position may be used), which would allow a user to create and post a security message 140, as shown in FIG. 1E.

FIG. 1E shows a user mobile device 12 running the security app 14 that is in contact with the SF 100. The security app 14 is shown displaying a new post screen 56 that comprises a field for a post header 58, a field for a post description 60, an upload image/video command or button 62, and a submit command or button 64.

FIG. 1F shows a user mobile device 12 with the security app 14 not being actively displayed, but running in the background, or being configured to receive notifications or push notifications 70 outside the app 17, such as in a notification center. Accordingly, FIG. 1F shows a message from a SF 100 titled "BlockWatch" ® with the message "Man yelling outside," being shown on user mobile device 12.

Figure 2:
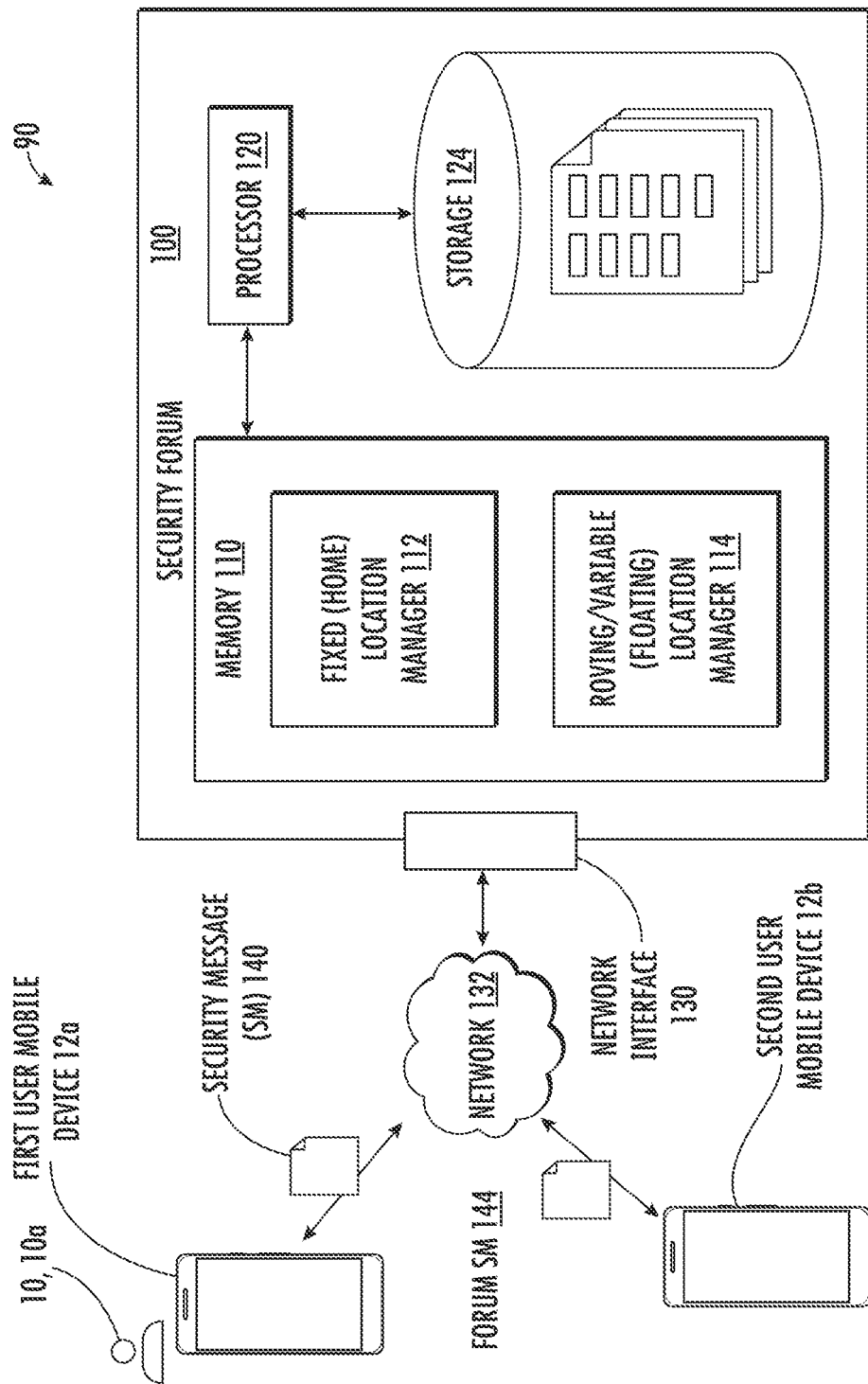
FIG. 2 illustrates a system for facilitating sending and receiving of security alerts.

FIG. 2 illustrates how the security forum 100 can work as part of a marketplace that allows multiple users 10 to engage with each other as part of a security forum (SF) 100, for sending and receiving security messages (SM) 140 and forum SMs 144. Security forum 100 may comprise memory 110, where a fixed or home location manager 112 and a roving or variable location manager 114 may be stored, and further shows the SF 100 comprising a processor 120 that is coupled to the memory 110 and the storage 124. The additional detail also further comprises the SF 100 comprising a network interface 130 coupled to a communications network 132.

FIG. 2 shows an example of how the SF 100 may be coupled to a first user mobile device 12a and how the SF 100 may also be coupled to a second user mobile device 12b, each user mobile device 12 being communicatively coupled with the security forum 100 through the network 132 and the network interface 130. SMs 140 and forum SMs 144, whether based on fixed alert area 30 or roving alert area 40 may be transferred or communicated through the network 132 between user mobile device 12 and the SF 100.

As such, a system for facilitating sending and receiving of security alerts 90 may comprise the SF 100 comprising the processor 120 communicatively coupled to the memory 110 and the network interface 130. The network interface 130 may be communicatively coupled to the network 132. The memory 110 may further comprise a fixed location manager 112, and a roving location manager 114. A plurality of user mobile devices 12 running a security alert mobile application 14 and communicatively coupled with the security forum 100 through the network 132 and the network interface 130. The plurality of user mobile devices 12, through the network 132 and the network interface 130, may be configured to communicate with the security forum 100 to send a first security message 140*a* associated with a first geographic location 21*b* to the fixed location manager 112 and to the roving location manager 114. The plurality of user mobile devices 12 may also be configured to receive a plurality of forum security messages 144 from the fixed location manager 112 and the roving location manager 114.

The security forum 100, through the network 132 and the network interface 130, may be configured to receive a plurality of security messages 140 from the plurality of user mobile devices 12, including a first security message 140*a* from one of the plurality of user mobile devices 12. The security forum 100, through the network 132 and the network interface 130, may also be configured to send a plurality of forum security messages 144 to the plurality of user mobile devices 12, including a first forum security message 144*a* sent to all of the plurality of user mobile devices 12 when: (i) a geographic location 21*a* associated with each of the plurality of user mobile devices 12 is within a fixed alert area 30 of the each of the plurality of user mobile devices 12, or (ii) when a geographic location 21*c* associated with the first forum security message 144*a* is within a roving alert area 40 of each of the plurality of user mobile devices 12.

Content of the first security message 140*a* may be identical to content of the first forum security message 144*a*, and the first geographic location 21*b* associated with the first security message 140*a* may be identical to the geographic location 21*c* associated with the first forum security message 144*a*. The first geographic location 21*b* associated with first security message 140*a* is a geographic location 21*a* of the user mobile device 12 sending the first security message 140*a* as determined, at least in part, by a GPS location of the user mobile device 12 sending the first security message 140*a*. The geographic location 21*c* associated with the first forum security message 144*a* and sent to the plurality of user mobile devices 12 may be incorporated from the fixed location manager 112 and from the roving location manager 114.

The fixed alert area 30 may be a circle with a center 34 of the circle at a fixed location, the fixed location comprising one of a domicile, a place of work, or a school. The fixed alert area 30 may comprise a user selected radius 32 in a range of 0.16-3.22 km (0.1-2.0 miles). The roving alert area 40 for each of the plurality of user mobile devices 12 may be a circle with a center 44 of the circle at a position of the respective user mobile device 12. A length of a radius 42 of the roving alert area 40 may be proportional to a moving speed of the user mobile device 12.

A single forum security message 144 may be sent from either the fixed location manager 112 or the roving location manager 114 to a portion of the plurality of user mobile devices 12 when a geographic location 21*c* associated with the forum security message 144 is within both the fixed alert area 30 and the roving alert area 40 for the portion of the plurality of user mobile devices 12.

A length of the radius 42 of the roving alert 40 may be 0.1-5.0 miles, or at or about 1 mile for every 0.25-6 miles per hour (mph) or at or about 3 mph, of an average moving speed of the user 12. A length of the radius 32 of the fixed alert area 30 and the length of the radius 42 of the roving area alert 40 may be definable by the user 12.

The roving forum security message 144 may not be sent to any of the plurality of user mobile devices 12 that have already received a fixed forum security message 144 when a geographic location 21*c* associated with the roving forum security message 144 is within both the fixed alert area 30 and the roving alert area 40. A roving forum security message 144 may not be sent to any of the plurality of user mobile devices 12 that comprise a roving alert area 40 that comprises the geographic location 21*c* associated with the roving forum security message 144 after an expiring period of time has elapsed or after an underlying matter that forms a basis of the security message 144 is resolved. The expiring period of time may be user defined, and may default at any suitable amount of time, such as 6 hours, 12, hours, 24 hours, 48 hours, and may also vary based on the type of security forum message 144, such as based on the alert level 22. In some instances, high risk alerts 22*a* being available for more time and medium risk alerts 22*b* and low risk alerts 22*c* may be present for less time.

The fixed location manager 112, the roving location manager 114, or both, receiving a plurality of security messages 140 from the plurality of mobile user devices 12 formed on a basis of a same underlying matter, such that the fixed forum security message 144 and the roving forum security message 144 are created by consolidating the plurality of security messages 140 from the plurality of mobile user devices 12 based on the same underlying matter or incident.

Relying on a fixed alert area 30 and a roving alert area 40, users 10 may not see other alerts outside of their own alert areas 30, 40. When a user 10 is in a roving mode, the user 10 may not be able to see posts or activity after leaving an area, unless the user 10 has commented on, or followed, a post, in which case continued access to the material even when outside of the alert areas 30, 40 may be available.

In some instances, a location or location data may be determined for a SM 140 based on dropping a pin or using current location of a user mobile device 12 for the incident location, (i.e. using GPS hardware in the phone. although other suitable methods may also be used.). In some instances, sharing of a location may be accomplished as part of a background task managed by the operating system, and may be set at a desirable frequency or interval.

Figure 3:
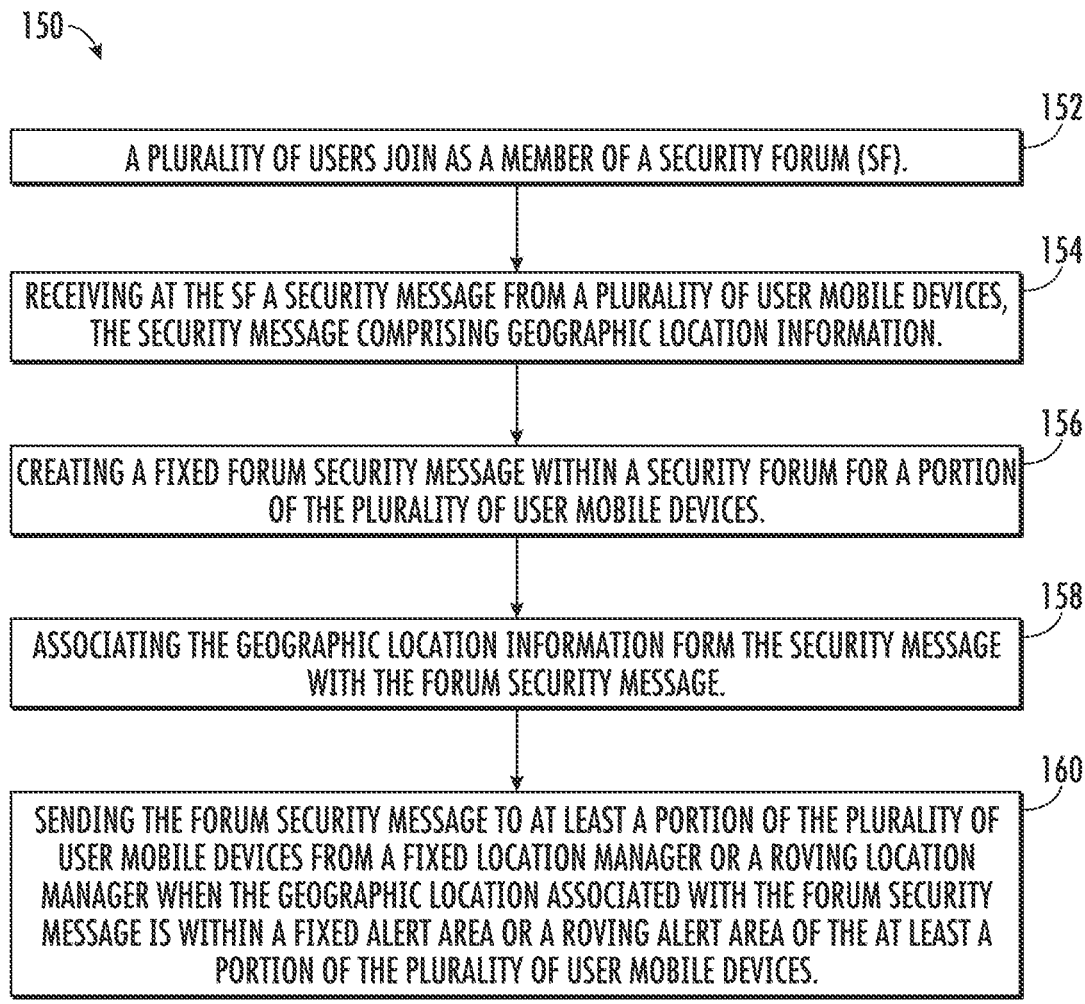
FIG. 3 illustrates a flowchart or wireframe showing how a user may connect with a SF.

FIG. 3 illustrates method, process, wire-frame, or flowchart 150 for facilitating the sending and receiving of security alerts 140, 144, comprising a number of elements. Element 152 shows receiving a security message 140 from a plurality of user mobile devices 12, the security message 140 comprising geographic location information 21*b*. Element 154 shows creating a fixed forum security message 144 within the SF 10 for a portion of the plurality of user mobile devices 12. Element 156 shows associating the geographic location information 21*b* from the security message 140 with the forum security message 144. Element 158 shows sending the forum security message 144 to at least a portion of the plurality of user mobile devices 12 from a fixed location manager 112 or a roving location manager 114 when the geographic location associated 21*c* with the forum security message 144 is within a fixed alert area 30 or a roving alert area 40 of the at least a portion of the plurality of user mobile devices 12.

FIGS. 4A and 4B show flow charts of how communications are routed to "public-safety answering point" or "public-safety access point" (PSAPs). FIG. 4A shows a conventional route or flow 200 and FIG. 4B shows an expedited rout or flow 210. FIG. 4A depicts conventional process for receiving and handling an emergency call at a PSAP. At the time of the preparation of the present application, there are approximately 6,300 primary 9-1-1 call centers or PSAPs in the US, with numerous small PSAPs serving rural areas or areas of low population density. When a call is placed such as by mobile device or cell phone 96, the call is being handled by a PSAP that has many protocols, and is handling the signal transmission based, in many cases, on infrastructure that was built in the 1960s. As shown in FIG. 4A, a call will go through a wireless carrier and a selective router to the PSAP, after which, in order for a location to be determined, a Phase 2 Fix will be determined by working through a local location database and a carrier location data base to triangulate a call position using cell towers through a positioning center, and then returning the position information to the PSAP. The Phase 2 Fix provides about 50% accuracy within 50 meters of caller location and requires about 30 seconds when everything works. Sometimes a rebid will not work, and location is not determined. If the Phase 2 Fix does not work for obtaining an location, the PSAP may reach out to a cell carrier directly and obtain caller location based on a service provider pin, which typically takes about 15-20 minutes.

FIG. 4B shows an improved system in which a user mobile device may reach out through the SF 100 to PSAP 202 through a signal center 214, can get GPS location information to the PSAP with 15 meters of accuracy in 3-5 seconds with live updates every 3-5 seconds. The signal center 214 may be a new signal center or existing telematics company or service provider like OnStar, RapidSOS, Vesta or VESTA 9-1-1 systems, GeoLynx or GeoComm GeoLynx Server, Solacom or Solacom Guardian 9-1-1, Zetron or Zetron Max Cal-Taking, Tritech, or any similar or suitable intermediary or direct connection to the PSAP.

The signal center 214 can see the data transmitted from the user mobile device 12 of the SF 100, confirm the data, and place a call to the PSAP 202 without dialing 9-1-1 and without dialing a 10 digit number because of relationship with the PSAP and the emergency center. The signal center 214 has integration with the PSAP, has a user interface (UI) and access tied directly to the PSAP. Because the signal center UI with the PSAP is supplemental data, it is not taxed with the regulatory burden of compliance with copious rules, and may be integrated with the PSAP Computer Automated Dispatch (CAD) system, improving communication delivery, bypassing old infrastructure, and relieving the user 14 the additional burden of calls, communication, and other steps that are seamlessly integrated with the SF 100.

The signal center 214 may have one-way direction for data sending, and may also limit the availability of data from the SF 100 to the PSAP 202 for a limited amount of time, such as for only 5-120 minutes, or 5-60 minutes, or 5-30 minutes, or 10 minutes. In some instances, availability of data from the signal center 214 to the PSAP 202 could vary based on location and anticipated response time. The data could be purged after a set amount of time absent any emergency event or user approved need to preserve data. A set amount of time until data is purge could be 3-72 hours, 6-48 hours, 24 hours, 12 hours, or any suitable amount of time thereabout.

Figure 5:
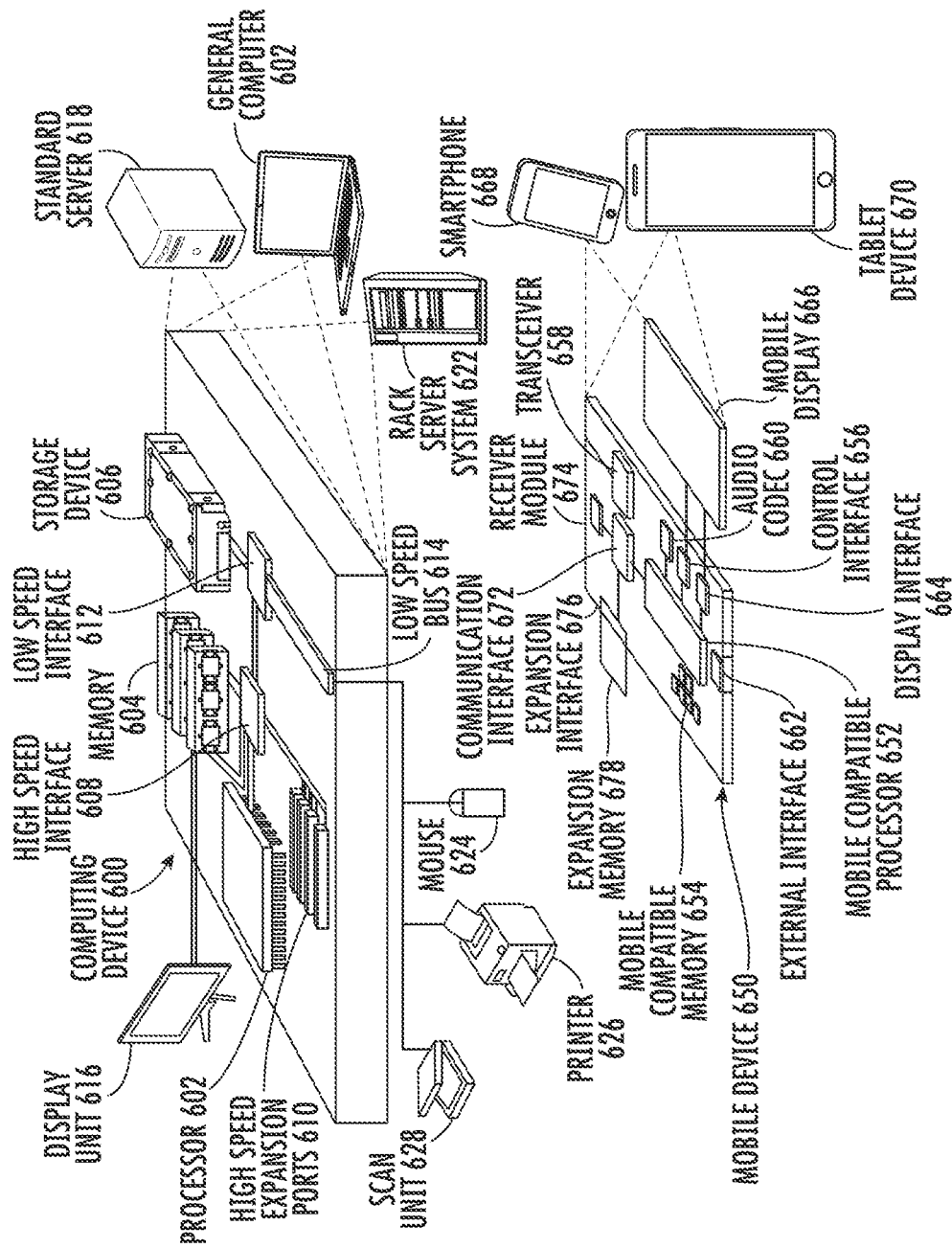
FIG. 5 illustrates a schematic diagram of devices that can be used to perform and/or implement any of the embodiments disclosed herein.

FIG. 5 is a schematic diagram of specific computing device 600 that may form part of SF 100, and a specific mobile computing device 650 that may form part of user mobile device 10, and that can be used to perform and/or implement any of the embodiments disclosed herein.

In one or more embodiments, the shared computing environment on which the system may be hosted in a virtualized or containerized implementation may be the specific computing device 600, or a collection of the specific computing device 600 operating together in a distributed manner, as is known in the art. The specific mobile computing device 650 may also be a client device, according to various embodiments.

The specific computing device 600 may represent various forms of digital computers, such as laptops, desktops, workstations, personal digital assistants, servers, blade servers, mainframes, and/or other appropriate computers. The specific mobile computing device 630 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 600 may include a processor 603, a memory 605, a storage device 606, a high-speed interface 608 coupled to the memory 605 and a plurality of high-speed expansion ports 610, and a low-speed interface 612 coupled to a low-speed bus 614 and a storage device 606. In one embodiment, each of the components heretofore may be inter-coupled using various buses, and may be mounted on a common motherboard and/or in other manners as appropriate. The processor 603 may process instructions for execution in the specific computing device 600, including instructions stored in the memory 605 and/or on the storage device 606 to display a graphical information for a GUI on an external input/output device, such as a display unit 616 coupled to the high-speed interface 608, according to one embodiment.

In other embodiments, multiple processors and/or multiple buses may be used, as appropriate, along with multiple memories and/or types of memory. Also, a plurality of specific computing device 600 may be coupled with, with each device providing portions of the necessary operations (e.g., as a server bank, a group of blade servers, and/or a multi-processor system).

The memory 605 may be coupled to the specific computing device 600. In one embodiment, the memory 605 may be a volatile memory. In another embodiment, the memory 605 may be a non-volatile memory. The memory 605 may also be another form of computer-readable medium, such as a magnetic and/or an optical disk. The storage device 606 may be capable of providing mass storage for the specific computing device 600. In one embodiment, the storage device 606 may be includes a floppy disk device, a hard disk device, an optical disk device, a tape device, a flash memory and/or other similar solid-state memory device. In another embodiment, the storage device 606 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 605, the storage device 606, a memory coupled to the processor 603, and/or a propagated signal.

The high-speed interface 608 may manage bandwidth-intensive operations for the specific computing device 600, while the low-speed interface 612 may manage lower bandwidth-intensive operations. Such allocation of functions is exemplary only. In one embodiment, the high-speed interface 608 may be coupled to the memory 605, the display unit 616 (e.g., through a graphics processor and/or an accelerator), and to the plurality of high-speed expansion ports 610, which may accept various expansion cards.

In the embodiment, the low-speed interface 612 may be coupled to the storage device 606 and the low-speed bus 614. The low-speed bus 614 may be comprised of a wired and/or wireless communication port (e.g., a Universal Serial Bus ("USB"), a Bluetooth® port, an Ethernet port, and/or a wireless Ethernet port). The low-speed bus 614 may also be coupled to the scan unit 628, a printer 626, a keyboard, a mouse 624, and a networking device (e.g., a switch and/or a router) through a network adapter.

The specific computing device 600 may be implemented in a number of different forms, as shown in the figure. In one embodiment, the specific computing device 600 may be implemented as a standard server 618 and/or a group of such servers. In another embodiment, the specific computing device 600 may be implemented as part of a rack server system 622. In yet another embodiment, the specific computing device 600 may be implemented as a general computer 620 such as a laptop or desktop computer. Alternatively, a component from the specific computing device 600 may be combined with another component in a specific mobile computing device 630. In one or more embodiments, an entire system may be made up of a plurality of specific computing device 600 and/or a plurality of specific computing device 600 coupled to a plurality of specific mobile computing device 630.

In one embodiment, the specific mobile computing device 630 may include a mobile compatible processor 652, a mobile compatible memory 634, and an input/output device such as a mobile display 646, a communication interface 672, and a transceiver 638, among other components. The specific mobile computing device 630 may also be provided with a storage device, such as a microdrive or other device, to provide additional storage. In one embodiment, the components indicated heretofore are inter-coupled using various buses, and several of the components may be mounted on a common motherboard.

The mobile compatible processor 652 may execute instructions in the specific mobile computing device 630, including instructions stored in the mobile compatible memory 634. The mobile compatible processor 652 may be implemented as a chipset of chips that include separate and multiple analog and digital processors. The mobile compatible processor 652 may provide, for example, for coordination of the other components of the specific mobile computing device 630, such as control of user interfaces, applications run by the specific mobile computing device 630, and wireless communication by the specific mobile computing device 630.

The mobile compatible processor 652 may communicate with a user through the control interface 636 and the display interface 644 coupled to a mobile display 646. In one embodiment, the mobile display 646 may be a Thin-Film-Transistor Liquid Crystal Display ("TFT LCD"), an Organic Light Emitting Diode ("OLED") display, and another appropriate display technology. The display interface 644 may comprise appropriate circuitry for driving the mobile display 646 to present graphical and other information to a user. The control interface 636 may receive commands from a user and convert them for submission to the mobile compatible processor 652.

In addition, an external interface 642 may be provide in communication with the mobile compatible processor 652, so as to enable near area communication of the specific mobile computing device 630 with other devices. External interface 642 may provide, for example, for wired communication in some embodiments, or for wireless communication in other embodiments, and multiple interfaces may also be used.

The mobile compatible memory 634 may be coupled to the specific mobile computing device 630. The mobile compatible memory 634 may be implemented as a volatile memory and a non-volatile memory. The expansion memory 658 may also be coupled to the specific mobile computing device 630 through the expansion interface 656, which may comprise, for example, a Single In-Line Memory Module ("SWIM") card interface. The expansion memory 658 may provide extra storage space for the specific mobile computing device 630, or may also store an application or other information for the specific mobile computing device 630.

Specifically, the expansion memory 658 may comprise instructions to carry out the processes described above. The expansion memory 658 may also comprise secure information. For example, the expansion memory 658 may be provided as a security module for the specific mobile computing device 630, and may be programmed with instructions that permit secure use of the specific mobile computing device 630. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 634, the expansion memory 658, a memory coupled to the mobile compatible processor 652, and a propagated signal that may be received, for example, over the transceiver 638 and/or the external interface 642.

The specific mobile computing device 630 may communicate wirelessly with network 132, such as through the communication interface 672, which may be comprised of a digital signal processing circuitry. The communication interface 672 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 638 (e.g., radio-frequency transceiver). In addition, short-range communication may occur, such as using a Bluetooth®, Wi-Fi, and/or other such transceiver. In addition, a GPS ("Global Positioning System") receiver module 654 may provide additional navigation-related and location-related wireless data to the specific mobile computing device 630, which may be used as appropriate by a software application running on the specific mobile computing device 630.

The specific mobile computing device 630 may also communicate audibly using an audio codec 640, which may receive spoken information from a user and convert it to usable digital information. The audio codec 640 may likewise generate audible sound for a user, such as through a speaker (e.g., in a handset smartphone of the specific mobile computing device 630). Such a sound may comprise a sound from a voice telephone call, a recorded sound (e.g., a voice message, a music files, etc.) and may also include a sound generated by an application operating on the specific mobile computing device 630.

The specific mobile computing device 630 may be implemented in a number of different forms, as shown in the figure. In one embodiment, the specific mobile computing device 630 may be implemented as a smartphone 648. In another embodiment, the specific mobile computing device 630 may be implemented as a personal digital assistant ("PDA"). In yet another embodiment, the specific mobile computing device, 630 may be implemented as a tablet device 650.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network, including network 132, may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the present disclosure. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the claims following the description set forth herein.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other networks, protocols, and hardware and examples could be intermixed or substituted with those provided. In places where the description above refers to particular embodiments of systems and methods for providing a data exchange marketplace through a blockchain network, it should be readily apparent that a number of modifications may be made without departing from the spirit thereof and that these embodiments and implementations may be applied to other to data exchange marketplaces and industries as well. Accordingly, the disclosed subject matter is intended to embrace all such alterations, modifications and variations that fall within the spirit and scope of the disclosure and the knowledge of one of ordinary skill in the art.

It will be understood that implementations are not limited to the specific components or industries disclosed herein, as virtually any components or industries consistent with the intended operation of a method and/or system implementation for an autonomous data exchange may be utilized. Accordingly, for example, although particular servers, clusters, and peers may be disclosed, such components may comprise any shape, size, style, type, model, version, class, grade, measurement, concentration, material, weight, quantity, and/or the like consistent with the intended operation of a method and/or system implementation for an autonomous data exchange may be used. In places where the description above refers to particular implementations of networks, peers, and databases, it should be readily apparent that a number of modifications may be made without departing from the spirit thereof and that these implementations may be applied to other networks, peers, and databases.

What is claimed is:

1. A method of facilitating sending and receiving security alerts, the method comprising:
   receiving a security message at a security forum over a network from a first mobile device of a plurality of mobile devices, wherein the security message comprises geographic location information of an incident and wherein each of the plurality of mobile devices is associated with an account of a user having a plurality of zones of interest comprising one or more fixed alert areas with static geographical boundaries and one or more roving alert areas with dynamic geographical boundaries based on a location of an associated mobile device;
   creating a forum security message within the security forum, the security forum comprising a processor communicatively coupled to a memory and a network interface, the network interface communicatively coupled to the network, wherein the memory further comprises a fixed location manager and a roving location manager;
   associating the geographic location information of the incident with the forum security message;
   identifying a subset of the plurality of mobile devices, wherein at least one of the plurality of zones of interest of the account of each of the mobile devices included in the subset of the plurality of mobile devices overlaps with the geographic location information of the incident;
   making the forum security message available to the subset of the plurality of mobile devices; and
   notifying the subset of the plurality of mobile devices about the forum security message.

2. The method of claim 1, further comprising receiving a selection of a zone of interest from one of the plurality of mobile devices.

3. The method of claim 1, wherein the one or more fixed alert areas of an account of a user associated with one of the plurality of mobile devices comprises a fixed alert area associated with a place of domicile and a fixed alert area associated with a place of work.

4. The method of claim 1, wherein the one or more fixed alert areas of an account of a user associated with one of the plurality of mobile devices comprises a fixed alert area associated with a place of domicile and a fixed alert area associated with a school.

5. The method of claim 1, wherein the one or more roving alert areas of an account of a user associated with one of the plurality of mobile devices comprises a roving alert area associated with the user and a roving alert area associated with a family member.

6. The method of claim 5, wherein the family member is a child.

7. The method of claim 1, wherein the plurality of zones of interest of an account of a user associated with one of the plurality of mobile devices comprises at least three zones of interest comprising a fixed home location, a dynamic user position, and a selected zone of interest for a child, a family member, a pet, a place of work, or a school.

8. A method of facilitating sending and receiving security alerts,
   the method comprising:
   receiving a security message at a security forum over a network, the security message comprising geographic location information of an incident;
   creating a forum security message within the security forum, the security forum comprising a processor communicatively coupled to a memory and a network interface, the network interface communicatively coupled to the network;
   associating the geographic location information of the incident with the forum security message;
   identifying a subset of a plurality of mobile devices, wherein each of the plurality of mobile devices is associated with an account of a user having a plurality of zones of interest comprising one or more fixed alert areas and one or more roving alert areas and wherein at least one of the plurality of zones of interest of the account of each of the mobile devices included in the subset of the plurality overlaps with the geographic location information of the incident; and
   making the forum security message available to the subset of the plurality of mobile devices.

9. The method of claim 8, further comprising receiving a selection of a zone of interest from one of the plurality of mobile devices.

10. The method of claim 8, wherein the one or more fixed alert areas of an account of a user associated with one of the plurality of mobile devices comprises a fixed alert area associated with a place of domicile and a fixed alert area associated with a place of work.

11. The method of claim 8, wherein the one or more fixed alert areas of an account of a user associated with one of the plurality of mobile devices comprises a fixed alert area associated with a place of domicile and a fixed alert area associated with a school.

12. The method of claim 8, wherein the one or more roving alert areas of an account of a user associated with one of the plurality of mobile devices comprises a roving alert area associated with the user and a roving alert area associated with a family member.

13. The method of claim 12, wherein the family member is a child.

14. The method of claim 8, wherein the plurality of zones of interest of an account of a user associated with one of the plurality of mobile devices comprises at least three zones of interest comprising a fixed home location, a dynamic user position, and a selected zone of interest for a child, a family member, a pet, a place of work, or a school.

15. A system for facilitating sending and receiving security alerts, the system comprising:
   a processor communicatively coupled to a memory and a network interface, the network interface communicatively coupled to a network;
   a fixed location manager communicatively coupled to the network interface and the network and configured to:
     receive security messages from a plurality of user mobile devices coupled with the network;
     create a fixed forum security message associated with a geographic location of a first security message received from at least one of the plurality of user mobile devices; and
     send the fixed forum security message to all of the plurality of user mobile devices associated with a user that selected a zone of interest comprising a fixed alert area that comprises the geographic location associated with the fixed forum security message; and
   a roving location manager communicatively coupled to the network interface and the network and configured to:
     receive security messages from the plurality of user mobile devices coupled with the network;

create a roving forum security message associated with the geographic location of the first security message; and send a roving forum security message to all of the plurality of user mobile devices associated with a user that selected a zone of interest comprising a roving alert area that comprises the geographic location associated with the roving forum security message.

16. The system of claim 15, wherein the zone of interest comprising a fixed alert area comprises two zones of interest including a fixed home location and a second fixed location.

17. The system of claim 16, wherein the second fixed location comprises a place of work or a school.

18. The system of claim 15, wherein the zone of interest comprising a roving alert area comprises two zones of interest including a dynamic user position and a second dynamic position.

19. The system of claim 18, wherein the second dynamic position comprises a position of a family member.

20. The system of claim 19, wherein the family member is a child.

\* \* \* \* \*